United States Patent [19]

Haley et al.

[11] Patent Number: 4,686,834
[45] Date of Patent: Aug. 18, 1987

[54] CENTRIFUGAL COMPRESSOR CONTROLLER FOR MINIMIZING POWER CONSUMPTION WHILE AVOIDING SURGE

[75] Inventors: Paul F. Haley; Brian S. Junk, both of La Crosse; Merle A. Renaud, Onalaska; Paul C. Rentmeester, La Crosse, all of Wis.

[73] Assignee: American Standard Inc., New York, N.Y.

[21] Appl. No.: 872,314

[22] Filed: Jun. 9, 1986

[51] Int. Cl.$^4$ .............................................. F25B 41/00
[52] U.S. Cl. ..................................... 62/209; 62/228.1; 62/230
[58] Field of Search ................. 62/228.1, 228.3, 228.4, 62/217, 201, 230, 209; 415/17; 417/19, 20

[56] References Cited

U.S. PATENT DOCUMENTS

| | | | |
|---|---|---|---|
| 3,778,695 | 12/1973 | Bauer, Jr. | 318/481 |
| 4,151,725 | 5/1979 | Kauntz et al. | 62/182 |
| 4,177,649 | 12/1979 | Venema | 62/209 |
| 4,355,948 | 10/1982 | Kountz et al. | 415/1 |
| 4,546,618 | 10/1985 | Kountz et al. | 62/201 |
| 4,562,531 | 12/1985 | Enterline et al. | 364/164 |
| 4,581,900 | 4/1986 | Lowe et al. | 62/228.1 |
| 4,608,833 | 9/1986 | Kountz | 62/228.1 |

Primary Examiner—Harry Tanner
Attorney, Agent, or Firm—William J. Beres; Robert J. Harter; Ronald M. Anderson

[57] ABSTRACT

This controller is used for controlling a centrifugal compressor along its path of minimum power consumption while avoiding a surge condition. It is especially useful in a refrigeration system having a variable speed centrifugal compressor with adjustable inlet guide vanes. In such an application, the controller opens the inlet guide vanes enough to satisfy the cooling demand and then, to minimize power consumption, reduces the speed of the compressor while further opening the vanes (compensating for the reduced speed) until either the inlet guide vanes are fully open or an impending surge condition is detected. The onset of a surge condition is detected by monitoring motor current fluctuations. When fluctuations above a predetermined amplitude occur in excess of a predetermined frequency, the controller determines that a surge is impending. The controller continues to control the compressor in this manner, providing a capacity that is minimally above a level that would cause a surge yet is sufficient to satisfy the cooling demand.

19 Claims, 4 Drawing Figures

CENTRIFUGAL COMPRESSOR CONTROLLER FOR MINIMIZING POWER CONSUMPTION WHILE AVOIDING SURGE

DESCRIPTION

Technical Field

This invention generally pertains to a controller for a centrifugal compressor, and specifically to a controller for operating a centrifugal compressor at the minimum speed that meets the capacity demand and avoids a surge condition.

BACKGROUND OF THE INVENTION

Controllers for operating a centrifugal compressor along a path of minimum power consumption typically reduce the speed of the compressor in response to a lower capacity demand. But when the speed drops too low, an undesirable surge condition can occur. When this happens the discharge pressure and flow rate fluctuate, and in severe cases, the flow can actually reverse direction. The poor performance caused by surging can also be accompanied by excess noise and damaging vibration.

In attempts to solve this problem several controllers have been developed which avoid operating compressors in the surge region. For example, U.S. Pat. No. 4,581,900 describes a surge detection method based both upon the rate of change of pressure developed across the compressor and the rate of change of current passing through the compressor motor. This detection method, as described in the patent, also includes selecting a pre-specified reset time interval based upon the size of the compressor. Although this patent offers a method of detecting a surge, which is not difficult to do since surges are typically quite noticeable and often violent, it offers no means of distinguishing a subtle impending surge condition from normal operating conditions.

In another example, U.S. Pat. No. 4,177,649 discloses a controller for a centrifugal compressor which identifies a surge condition as a reduction in discharge flow with a corresponding reduction in discharge pressure. In a graphical illustration representing discharge pressure on the vertical axis and flow rate on the horizontal axis, this patent defines the surge region as the portion of the graphed function having a positive slope. Conversely, the non-surge region is the portion of the graphed function which has a negative slope, wherein the flow increases as the discharge pressure decreases. The controller continuously varies the capacity of the compressor alternately about an operating point and senses two parameters, e.g., discharge pressure and discharge flow, that not only vary with the capacity but also are used to determine the slope of the function. Surge is then avoided by operating only in the negative slope region. This controller may be useful in some applications, but problems are likely to arise if it is used with compressors having a load curve with a substantial flat region between the positive and negative slope portion of the curve so that the point of impending surge is not clearly defined. Worse yet, this controller would not be effective with many compressors which have a surge region that extends into the negative slope portion of the curve.

Two other controllers which avoid the problems and limitations of the slope sensing method are disclosed in U.S. Pat. Nos. 4,151,725 and 4,546,618. These two controllers include a microprocessor with access to data stored in memory defining the operating curve and/or surge region of the specific compressor it is controlling. Unfortunately, these controllers are limited to controlling only compressors having a particular load curve that corresponds to the stored data. Before the microprocessor program can be used, the load characteristics of the particular compressor model must be known and these characteristics may vary between compressors of the same design. In addition, the load characteristics can be affected not only by the system associated with the compressor but also by aging of both the compressor and its system.

U.S. Pat. No. 4,355,948, Kountz et al, discloses a controller which is essentially the same as the '725 Kountz et al, but further includes two field adjustable potentiometers for custom fitting the operating curve to match the load conditions of a particular compressor in a particular application. The disadvantage of this controller is that it is not universally adaptable to a variety of compressors without first preprogramming an operating curve to match the specific compressor and later field adjusting it to match the system.

U.S. Pat. No. 3,778,695 discloses a controller for a motor driven centrifugal compressor that claims to identify the onset of a surge by measuring the motor current. When the current drops below a predetermined value, it is assumed that a surge is impending and a relief valve is opened. One problem with this method is that the current level at which a surge is impending is not a constant. It varies as a function of compressor load, which in turn, can vary from one compressor to the next and from one system to the next. Although this method may be useful as a lower limit safety device, it would not enable operation of a compressor along its path of minimum power consumption.

In consideration of the above, it is an object of this invention to provide a controller that operates a centrifugal compressor along its path of minimum power consumption while avoiding a surge condition.

Another object is to provide a controller that is universally adaptable to a variety of compressors without having to preprogram an operating curve to meet the characteristics of a specific compressor.

Another object is to provide a controller that senses the onset of a surge over a wide range of operating points, including the negative slope portion of the pressure/flow curve.

These and other objects will be apparent from the attached drawings and the description of the preferred embodiments that follow below.

SUMMARY OF THE INVENTION

The subject invention is a controller for operating a centrifugal compressor along its path of minimum power consumption while satisfying a demand and avoiding a surge. The controller senses an operating parameter that is indicative of the capacity of the compressor, stores a selected setpoint that represents a desired value of the operating parameter, and detects any impending surges. An impending surge is detected by sensing fluctuation in the electric current supplied to the compressor motor. A surge is impending whenever fluctuation in excess of a predetermined amplitude occurs in excess of a predetermined frequency. The controller, in response to the operating parameter, the setpoint, and the supply current, controls the compressor such that its capacity is minimally above a level that would cause a surge condition yet is sufficient to maintain the operating parameter at the setpoint.

DESCRIPTION OF THE PREFERRED EMBODIMENT

Figure 1:
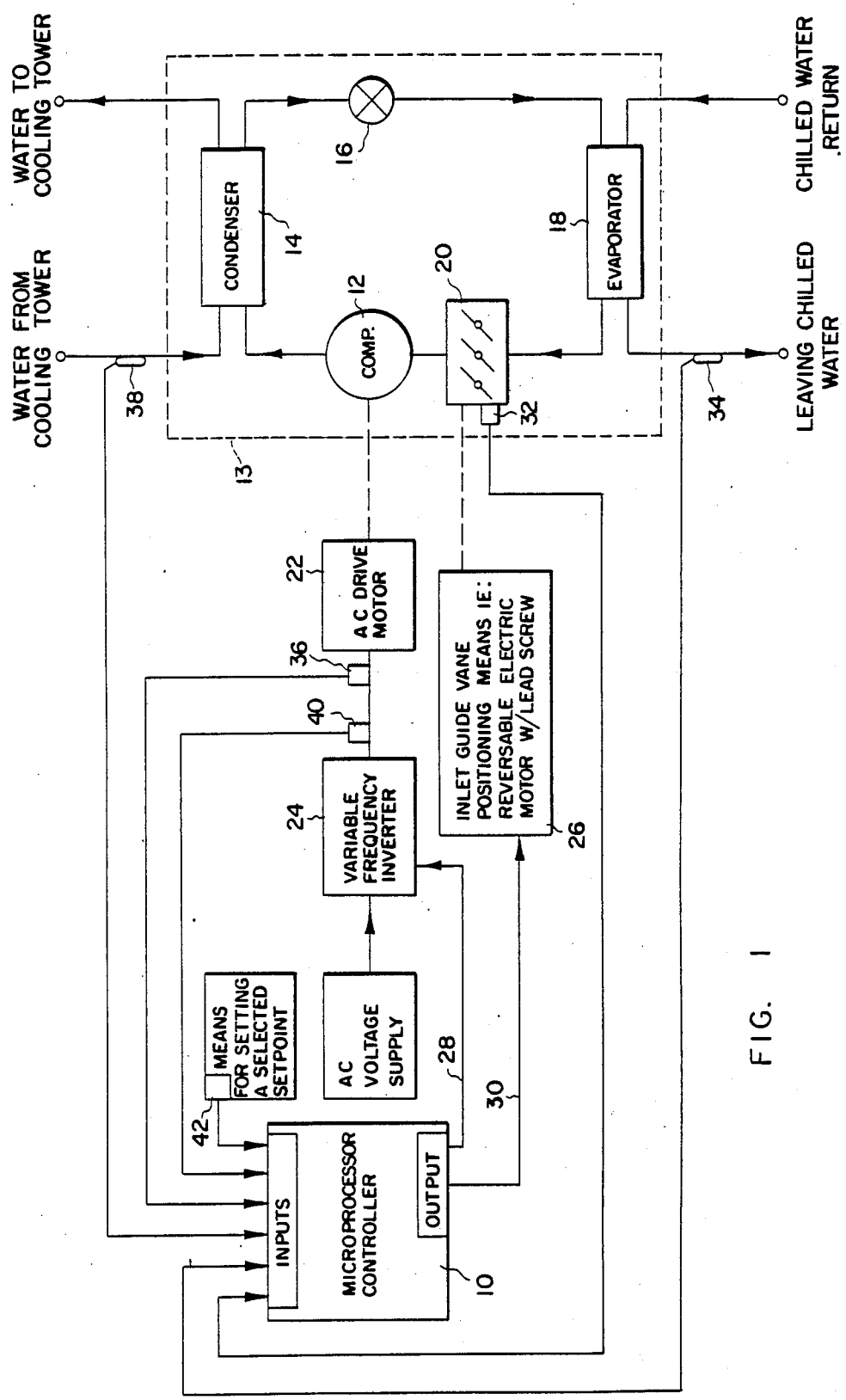
FIG. 1 is a block diagram showing the subject invention controlling a temperature conditioning system.

In FIG. 1, controller 10 is shown controlling centrifugal compressor 12 and its variable inlet guide vanes 20 in temperature conditioning system 13. System 13 is a closed loop system for chilling water and also includes water cooled condenser 14, expansion valve 16, and evaporator 18. Although in the preferred embodiment compressor 12 is shown coupled to an AC inductive motor 22 driven by variable frequency inverter 24, other variable speed drives, such as a DC motor, would also be acceptable. Inlet guide vanes 20 are positioned by inlet guide vane positioning means 26 which include a lead screw (not shown) driven by a reversible electric motor (not shown). However, it should be appreciated that a variety of other positioning means such as hydraulic or pneumatic actuation would work just as well to perform this function.

Compressor 12 is controlled along its path of minimum power consumption by two output signals on leads 28 and 30. The signal on output lead 28 controls the speed of compressor 12 by modulating the output frequency of inverter 24. Output lead 30 provides a signal to the reversible motor included in vane positioning means 26 for opening or closing inlet guide vanes 20. As an alternative, output lead 30 could be divided into two leads (not shown) with one carrying a signal to close guide vanes 20 and the other a signal to open guide vanes 20.

Figure 3:
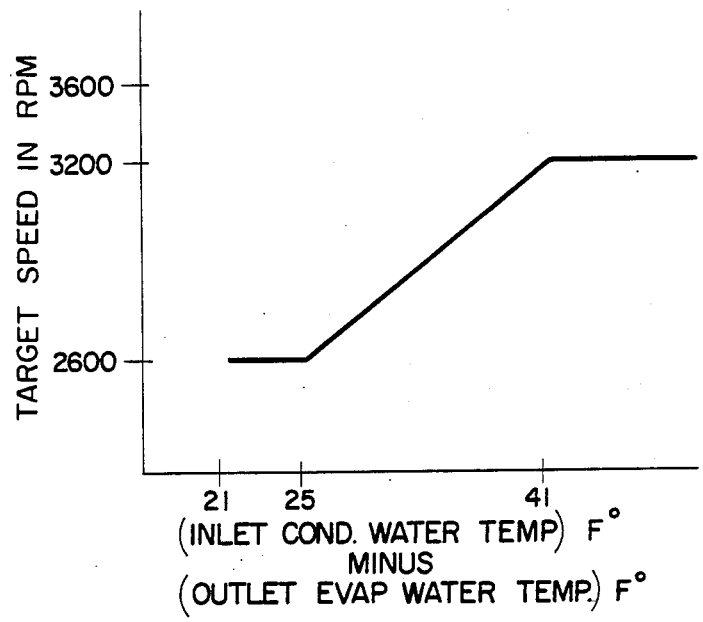
FIG. 3 is a graphical illustration of the algorithm used by the controller for determining a target speed.

Controller 10 controls the operation of system 13 in response to input signals received from six input devices 32, 34, 36, 38, 40, and 42 which are operable as follows:
(1) inlet guide vane position sensor 32 is a position feedback
  means for providing a signal to controller 10 indicating the position of guide vanes 20. In the preferred embodiment, the means used is a potentiometer (not shown) whose resistance changes with the position of inlet guide vanes 20. A limit switch (not shown) is an alternative to the potentiometer and can be used to merely indicate when inlet guide vanes 20 are fully open.
(2) first temperature sensor 34 is a thermistor indicating the temperature of the chilled water leaving evaporator 18. But it should be noted that other sensing means would work just as well, provided they also sense the condition of a parameter that is affected the capacity of compressor 12, e.g., a discharge pressure sensor or a refrigerant temperature sensor.
(3) speed sensor 36 is a frequency counter used as means for sensing the speed of compressor 12. This sensor is shown transmitting the output frequency of inverter 24 to controller 10. Another method would be to sense the speed with a speed transducer (not shown) connected directly to compressor 12 or its motor 22.
(4) second temperature sensor 38 is a thermistor that provides a signal indicating the temperature of the water cooling the condenser 14. This temperature, in addition to the temperature of the chilled water leaving evaporator 18, is used to derive a speed that approaches but does not result in a surge condition. This is referred to as the "target speed" and it facilitates coarse speed adjustments of compressor 12. The target speed can be generally considered a function of the pressure differential across compressor 12, however, temperature sensors 34 and 38 are used in the preferred embodiment to empirically derive this function as shown in FIG. 3. It should be appreciated that as alternatives a variety of other parameters could also be sensed to determine the target speed, e.g., the temperature or pressure rise across compressor 12 or the saturated pressure and saturated temperature of the refrigerant in either evaporator 18 or condenser 14.
(5) current transformer 40 is a means for detecting an impending surge by sensing fluctuations in the current supplied to drive motor 22 or inverter 24.
(6) means for setting a selected setpoint 42—the setpoint is a desired value of an operating parameter indicative of the capacity of compressor 12. In the preferred embodiment this operating parameter is the temperature of the chilled water leaving evaporator 18. A potentiometer is used as the means for inputting the setpoint to the microprocessor of controller 10, however, a variety of other input devices such as a numerical keyboard (not shown) would also work.

Figure 2:
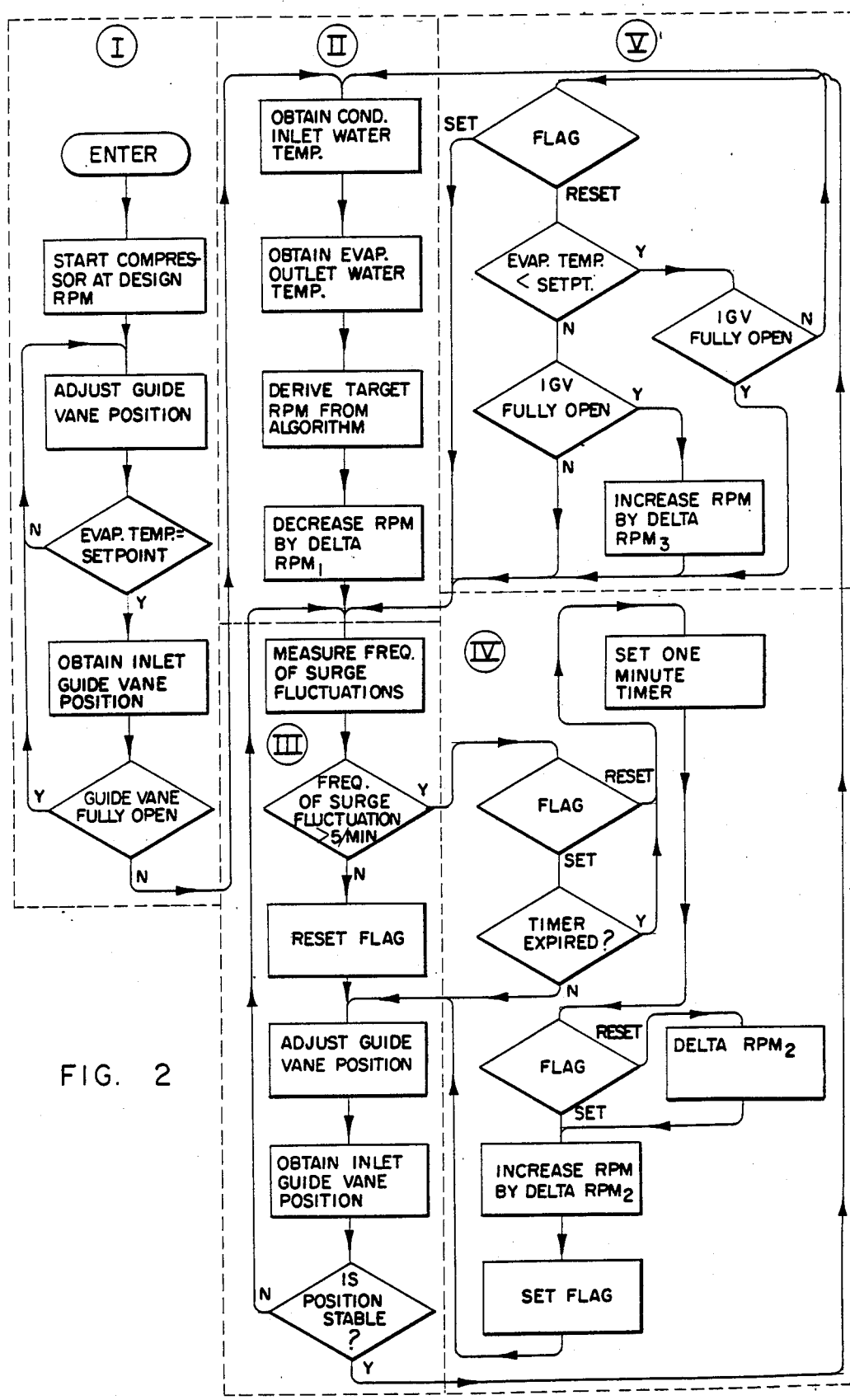
FIG. 2 is a flow chart showing the logic the controller uses to vary the speed of a compressor and the position of the compressor inlet guide vanes.
Figure 4:
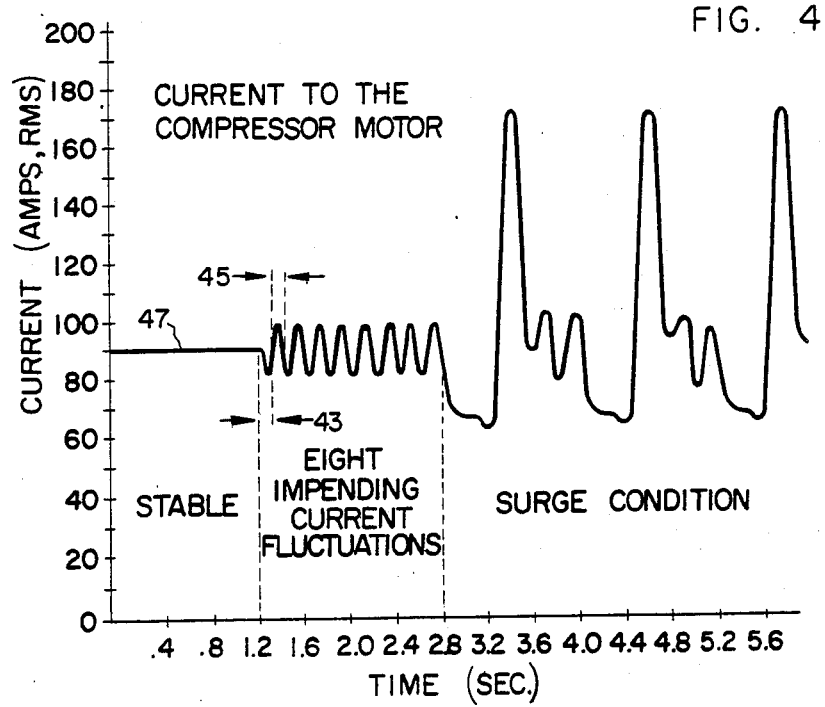
FIG. 4 graphically illustrates how a surge affects compressor motor current.

Controller 10 is the control means responsive to the six input devices 32, 34, 36, 38, 40, and 42 for controlling the compressor speed and inlet guide vane position by providing output signals over leads 28 and 30 according to the flow chart shown in FIG. 2. This flow chart can be divided into five sections which function as follows:
Section I—Starts compressor 12 at a design speed, e.g., 3600 RPM, and adjusts the inlet guide vanes 20 until the temperature of the chilled water leaving evaporator 18 is less than or equal to the setpoint. If the setpoint is met while inlet guide vanes 20 are not fully open, the control shifts to Section II.
Section II—Decreases the speed of compressor 12 by "Delta" RPM. When making fine speed adjustments, Delta RPM is a predetermined value, however, when making coarse speed adjustments, however, Delta RPM equals the difference between the target speed and the actual operating speed. The target speed can be considered a function of the net result of the inlet condenser water temperature minus the outlet evaporator water temperature. The microprocessor of controller 10 calculates this temperature differential and derives the target speed from a stored algorithm which is graphically represented in FIG. 3. The target speed can be found on the vertical axis with reference to the temperature differential shown on the horizontal axis.
Section III—Adjusts the position of inlet guide vanes 20 so that the temperature of the chilled water leaving evaporator 18 matches the setpoint. Control logic remains in this section until the guide vane position stabilizes, at which time the control shifts to Section V. However, Section III also checks for an impending surge. Surge is detected by monitoring the motor current with current transformer 40. At the onset of a surge the motor current will start to fluctuate, as shown in FIG. 4. Typically, the current will dip to a low point during a first current pulse 43 and then increase to a high point during a second pulse 45. If the amplitude of the high point is 15% greater than the low point, the two pulses 43 and 45 are considered one significant current fluctuation. An impending surge is identified when the microprocessor of controller 10 counts at least five of these fluctuations during a one-minute interval (frequency of the fluctuations is at least five cycles per minute). The 15% value and the five fluctuations per minute are predetermined values which can be changed to achieve varying degrees of sensitivity to an impending surge condition. Alternatively, a significant current fluctuation can be counted by detecting just one of two pulses 43 or 45, wherein the amplitude of pulse 43 or 45 deviates by the 15% value from the average current amplitude 47 sensed just prior the pulse 43 or 45. If an impending surge is detected, the control shifts to Section IV.

Section IV—Is only entered when an impending surge is detected. This section increases the speed of compressor 12 by a predetermined increment and maintains this higher speed for a set time period or until the impending surge is no longer detected. After increasing the speed, the control returns to Section III.

Section V—Provides the following logic steps:
(1) If the temperature of the water leaving evaporator 18 is greater than the setpoint and:
 (a) the inlet guide vanes 20 are not fully open, go to Section III, or let guide vanes are fully open,
 (b) the inlet guide vanes are fully open, then increase the speed by delta RPM (another preselected programmed value) and go to Section III; or
(2) If the temperature of the leaving chilled water is no greater than the setpoint and:
 (a) inlet guide vanes 20 are not substantially fully open, go to Section II, or
 (b) inlet guide vanes 20 are fully open, go to Section III As temperature conditioning system 13 operates according to the flow chart described above and illustrated in FIG. 2, the inlet guide vanes are positioned to meet the temperature or capacity demand while the compressor speed is reduced until either the inlet guide vanes 20 are fully open or an impending surge is detected. As a result, the compressor is operated along its path of minimum power consumption while avoiding surge.

Although the subject invention is described with respect to the above preferred embodiment, modifications thereto will become apparent to those skilled in the art. Therefore, the scope of the invention is to be determined by reference to the claims which follow.

We claim:
1. For use with a variable capacity centrifugal compressor driven by an electric motor, a controller for adjusting the capacity of the compressor to satisfy a demand, minimize electric power consumption and avoid a surge condition, comprising:
 a. means for sensing an operating parameter that is indicative of the capacity of the compressor;
 b. means for setting a selected setpoint that represents a desired value of the operating parameter;
 c. surge sensing means for detecting an impending surge by sensing fluctuation in the electric current supplied to the compressor motor, wherein an impending surge is detected whenever fluctuations in excess of a predetermined amplitude occur in excess of a predetermined frequency; and
 d. control means, responsive to the operating parameter sensing means, the setpoint setting means, and the surge sensing means, for controlling the compressor, such that its capacity is minimally above a level that would cause a surge condition yet is sufficient to maintain the operating parameter at the setpoint.

2. The controller as recited in claim 1, wherein each current fluctuation indicative of an impending surge condition includes a first and second current pulse, wherein the first pulse is a decrease in motor current and the second pulse is an increase in motor current.

3. A controller as recited in claim 1 wherein the compressor is used in a temperature conditioning system for conditioning the temperature of a fluid, and wherein the operating parameter is the temperature of the fluid and the setpoint is the desired temperature of the fluid.

4. A controller as recited in claim 3, wherein the compressor is driven by a variable speed motor and includes adjustable inlet guide vanes, and wherein the controller further comprises:
 a. means for sensing the speed of the compressor;
 b. position feedback means for sensing the position of the inlet guide vanes; and
 wherein the control means include a microprocessor and in response to the temperature of the fluid, the setpoint, the surge sensing means, the speed sensing means, and position feedback means, are further operable to:
  i. reduce the speed of the compressor when:
   (1) the inlet guide vanes are not substantially fully open,
   (2) the temperature of the fluid is less than the setpoint, and
   (3) a surge condition is not impending; and
  ii. increase the speed of the compressor when:
   (1) a surge condition is impending, or
   (2) the temperature of the fluid is greater than the setpoint and the inlet guide vanes are substantially fully open.

5. The controller as recited in claim 4, further comprising means, responsive to the output sensing means, for variably positioning the inlet guide vanes between an opened and closed position.

6. The controller as recited in claim 4, wherein the motor is driven by a variable frequency inverter and the control means are further operable to control the speed of the motor by varying the inverter frequency.

7. The controller as recited in claim 4, wherein the temperature conditioning system includes a condenser cooled by a second fluid and the controller further comprises a temperature sensor for sensing the temperature of the second fluid, wherein the control means, in further response to the temperature sensor, derive a target speed for making coarse reductions in compressor speed.

8. The controller as recited in claim 4, wherein said microprocessor, in response to an impending surge condition, increases the speed of the compressor in increments with time delays therebetween.

9. In a system for temperature conditioning a fluid using a variable capacity centrifugal compressor which has adjustable inlet guide vanes and which is driven by a variable speed motor, a controller for adjusting the capacity of the compressor to satisfy a demand, minimize electric power consumption, and avoid a surge condition, comprising:

a. a temperature sensor for sensing the temperature of the fluid;
   b. means for setting a desired fluid temperature setpoint;
   c. means for sensing the speed of the compressor;
   d. position feedback means for sensing the position of the inlet guide vanes;
   e. surge sensing means for detecting an impending surge by sensing fluctuation in the RMS value of the electric current supplied to the compressor motor, wherein an impending surge is detected whenever fluctuations in excess of a predetermined amplitude occur in excess of a predetermined frequency; and
   f. control means, including a microprocessor responsive to the temperature sensor, the temperature setpoint setting means, the compressor speed sensing means the position feedback means, and the surge sensing means, for positioning the inlet guide vanes so that the temperature of the fluid is maintained at the setpoint and for controlling the compressor speed to a minimum level which is still sufficient to avoid a surge.

10. The controller as recited in claim 9, wherein each current fluctuation indicative of an impending surge condition includes a first and second current pulse, wherein the first pulse is a decrease in motor current and the second pulse is an increase in motor current.

11. The controller as recited in claim 10, wherein the control means varies the position of the inlet guide vanes to maintain the fluid temperature at the setpoint and varies the speed of the compressor by:

i. reducing the speed of the compressor when:
      (1) the inlet guide vanes are not substantially fully open,
      (2) the temperature of the fluid is less than the setpoint, and
      (3) a surge condition is not impending; and
   ii. increasing the speed of the compressor when:
      (1) a surge condition is impending, or
      (2) the temperature of the fluid is greater than the setpoint and the inlet guide vanes are substantially fully open.

12. The controller as recited in claim 11, wherein the motor is driven by a variable frequency inverter and the control means are further operable to control the speed of the motor by varying the inverter frequency.

13. The controller as recited in claim 11, wherein the temperature conditioning system includes a condenser cooled by a second fluid and the controller further comprises a second temperature sensor for sensing the second fluid temperature, and wherein the control means, in further response to the second temperature sensor, derives a target speed for making coarse reductions in compressor speed.

14. The controller as recited in claim 11, wherein said microprocessor, in response to an impending surge condition, incrementally increases the speed of the compressor in increments with time delays therebetween.

15. In a system for temperature conditioning a fluid, having an evaporator, a condenser, and a variable capacity centrifugal compressor with adjustable inlet guide vanes and driven by a variable speed motor, a controller for adjusting the capacity of the compressor to satisfy a temperature conditioning demand, minimize electric power consumption, and avoid a surge condition, comprising:

a. a temperature sensor for sensing the temperature of said fluid;
   b. means for sensing the speed of said compressor;
   c. position feedback means for sensing the position of said inlet guide vanes;
   d. surge sensing means for detecting an impending surge by sensing fluctuation in the RMS value of the electric current supplied to the compressor motor, wherein an impending surge is detected whenever fluctuations in excess of a predetermined amplitude occur in excess of a predetermined frequency;
   e. means for setting a fluid temperature setpoint;
   f. inlet guide vane positioning means for variably positioning the inlet guide vanes between an opened and closed position; and
   g. control means that include a microprocessor responsive to the temperature sensor, the setpoint setting means, the speed sensing means, the position feedback means, and the surge sensing means, for controlling the position of the inlet guide vanes by providing a control signal to the inlet guide vane positioning means and for:
      i. reducing the speed of the compressor when:
         (1) the inlet guide vanes are not fully open,
         (2) the temperature of the fluid is less than the setpoint, and
         (3) a surge condition is not impending; and
      ii. increasing the speed of the compressor when:
         (1) a surge condition is impending, or
         (2) the temperature of the fluid is greater than the setpoint and the inlet guide vanes are substantially fully open.

16. The controller as recited in claim 15, wherein each current fluctuation indicative of an impending surge condition includes a first and second current pulse, wherein the first pulse is a decrease in motor current and the second pulse is an increase in motor current.

17. The controller as recited in claim 15, further comprising, a second temperature sensor for sensing the temperature of a second fluid used to cool the condenser and wherein the control means, in further response to the second temperature sensor, derive a target speed for making initial coarse reductions in compressor speed.

18. The controller as recited in claim 15, wherein said microprocessor, in response to an impending surge condition, increases the speed of the compressor in increments with time delays therebetween.

19. The controller as recited in claim 15, wherein the motor is driven by a variable frequency inverter and the control means are further operable to control the speed of the motor by varying the inverter frequency.

* * * * *

UNITED STATES PATENT AND TRADEMARK OFFICE
CERTIFICATE OF CORRECTION

PATENT NO. : 4,686,834

DATED : August 18, 1987

INVENTOR(S) : Paul F. Haley, Brian S. Junk, Merle A. Renaud, and Paul C. Rentmeester It is certified that error appears in the above-identified patent and that said Letters Patent is hereby corrected as shown below:

In The Specification:

Column 5, line 33, delete "let guide vanes are fully open,"

Signed and Sealed this

Twenty-ninth Day of December, 1987

Attest:

DONALD J. QUIGG

Attesting Officer

Commissioner of Patents and Trademarks